(12) United States Patent
Kang et al.

(10) Patent No.: US 6,410,639 B1
(45) Date of Patent: Jun. 25, 2002

(54) FILMING SOLUTION AND METHOD FOR FORMING A FILMING LAYER ON A CATHODE RAY TUBE

(75) Inventors: Young-Jong Kang; Ik-Chul Lim; Seung-Joon Yoo, all of Kyonggi-do; Eun-Ha Hoh, Seoul, all of (KR)

(73) Assignee: Samsung SDI Co., Ltd., Youngin (KR)

( * ) Notice: Subject to any disclaimer, the term of this patent is extended or adjusted under 35 U.S.C. 154(b) by 0 days.

(21) Appl. No.: 09/478,042

(22) Filed: Jan. 5, 2000

(30) Foreign Application Priority Data

Jun. 11, 1999 (KR) .............................. 99-21706

(51) Int. Cl.⁷ .............................................. C08L 33/06
(52) U.S. Cl. ..................................... 524/561; 526/329.2
(58) Field of Search .......................................... 524/561

(56) References Cited

U.S. PATENT DOCUMENTS

| | | | | |
|---|---|---|---|---|
| 3,742,092 A | * | 6/1973 | Duke | 260/880 |
| 4,079,101 A | * | 3/1978 | Duke | 260/879 |
| 4,764,554 A | * | 8/1988 | Tonge | 524/558 |
| 5,175,112 A | * | 12/1992 | Amiral | 436/533 |
| 5,385,982 A | * | 1/1995 | McCaul | 525/310 |
| 6,043,293 A | * | 3/2000 | Belik | 521/134 |

FOREIGN PATENT DOCUMENTS

| | | |
|---|---|---|
| KR | P1993-0018621 | 9/1993 |
| KR | 96-35710 | 10/1996 |

OTHER PUBLICATIONS

Korean Patent Office Action (Notice to Submit Response), dated Mar. 2, 2001 with English translation.

* cited by examiner

Primary Examiner—Paul R. Michl
(74) Attorney, Agent, or Firm—Robert E. Bushnell, Esq.

(57) ABSTRACT

A filming solution contains a copolymerized emulsion having more than 70 wt % of butyl methacrylate and more than one species of monomer, and more than one species of additive. Preferably, the monomer is selected from the group consisting of acrylic acid derivative, methacrylic acid derivative, styrene, acrylamide, and acrylonitrile.

14 Claims, No Drawings

FILMING SOLUTION AND METHOD FOR FORMING A FILMING LAYER ON A CATHODE RAY TUBE

BACKGROUNDS OF THE INVENTION

1. Field of the Invention

The present invention relates to a cathode ray tube ("CRT") and, more particularly to a filming solution and method for forming a filming layer on a CRT.

2. Description of the Prior Art

Generally, a phosphor screen of a CRT converts electron beam energy radiated from an electron gun into optical energy to realize an image is by exciting a phosphor. The phosphor screen is formed through a black matrix forming process and an RGB pattern forming process.

The phosphor screen is covered by an aluminum layer to increase brightness and prevent the phosphor screen from experiencing a potential drop and being burned. The aluminum layer is formed by evaporation and diffusing aluminum material on the phosphor screen under the vacuum condition.

However, since a plurality of phosphor holes are formed on red, green, blue phosphors of the phosphor screen, when evaporating the aluminum material on the phosphor screen, the aluminum material is filled into the phosphor holes, deteriorating a mirror effect of the aluminum layer.

To solve the above problem, coating material is deposited on the phosphor screen such that the coating material is filled in the phosphor holes. That is after the phosphor screen is formed on an inner surface of a panel, a film solution is deposited on the phosphor screen to flatten the surface of the phosphor screen. After that, the aluminum layer is deposited on the filming solution, thereby reducing the uneven surface rate of the aluminum layer. As a result, the reflecting effect is enhanced to improve the brightness of a CRT display.

Such a coating layer is preferably an organic film, which does not affect the phosphor screen and the radiation of the electron beams from the electron gun. A process for forming the organic film on the phosphor screen is called a filming process.

In addition, after the aluminum layer is deposited on the organic film, a baking process should be performed to completely remove unnecessary organic material. That is, the phosphor screen on which the aluminum layer is deposited is heated at a temperature of about 350–450° C.

There are two conventional filming technologies: one uses aqueous acryl emulsion and the other uses oil lacquer.

In the technology using the aqueous acryl emulsion, polyvinyl alcohol, acryl emulsion, glycerin, ammonium hydroxide ($NH_4OH$), and hydrogen peroxide are added. Therefore, a baking process for removing unnecessary organic material of the phosphor screen and filming layer should be conducted at a temperature of 400–450° C., after which a flit sealing process for combining a panel and a funnel should be conducted at a temperature of 400–450° C.

However, the baking process is time-consuming. If the baking process is not conducted, the unnecessary organic material generates an organic gas during the flit sealing process, making it difficult to effectively combine the panel and the funnel to each other.

In the case of technology using the oil lacquer, although the baking process is not required since the amount of the organic material is small. However since the oil lacquer is so flammable, an additional safety system is required.

SUMMARY OF THE INVENTION

Therefore, the present invention has been made in an effort to solve the above-described problems of the prior art.

It is a first objective of the present invention to provide a filming method of a CRT, which can form a filming layer on a phosphor screen using an acryl emulsion without additional baking process.

It is another objective of the present invention to provide a filming solution containing an acryl emulsion which can be formed on a phosphor screen as a filming layer.

To achieve the first objective, the present invention provides a method for forming a filming layer of a cathode ray tube, comprising the steps of depositing a filming solution comprising more than 70 wt % of butyl methacrylate on a phosphor screen, and spraying ammonium oxalate solution on the deposited filming solution.

The method may further comprise the step of causing the film to be undergone a baking process. Preferably, the baking process is conducted simultaneously with a flit sealing process for combining a panel and a funnel with each other.

To achieve the second objective, the present invention provides a filming solution comprising a copolymerized emulsion having more than 70 wt % of butyl methacrylate and at least one monomer, and more than one species of additive.

Preferably, the monomer is selected from the group consisting of acrylic acid derivative, methacrylic acid derivative, styrene, acrylamide and acrylonitrile.

Preferably, the acrylic acid derivative is selected from the group consisting of acrylic acid methyl acrylate, ethyl acrylate, and benzyl acrylate. In addition, the methacrylic acid derivative is selected from the group consisting of methacrylic acid, methyl methacrylate, ethyl methacrylate, hydroxyethyl methacrylate, isobonyl methacrylate, benzyl methacrylate, and phenoxy methacrylate.

Preferably, an amount of the emulsion in the filming solution is about 4–40 wt % in a solid state.

The additive is selected from the group consisting of polyvinyl alcohol, hydrogen peroxide, surface active agent and antifoaming agent.

The filming solution may further comprise a viscosity enhancing material.

DETAILED DESCRIPTION OF THE PREFERRED EMBODIMENT

A preferred embodiment of the present invention will be described hereinafter.

An emulsion of the present invention is first obtained by copolymerizing 70 wt % of butyl methacrylate and at least one species selected from the group consisting of acrylic acid derivative, methacrylic acid derivative, styrene acrylamide, and acrylonitrile.

The acrylic acid derivative is selected from the group consisting of acrylic acid methyl acrylate, ethyl acrylate, and benzyl acrylate. The methacrylic acid derivative is selected from the group consisting of methacrylic acid, methyl methacrylate, ethyl methacrylate, hydroxyethyl methacrylate, isobonyl methacrylate, benzyl methacrylate, and phenoxy methacrylate.

As an anionic surface active agent for the copolymerizing process, sodium dodecyl sulfosuccinate may be used.

In addition, a filming solution of the present invention is made by adding more than one additive to the copolymerized emulsion containing more than 70 wt % of butyl methacrylate. The additive is selected from the group consisting of polyvinyl alcohol, hydrogen peroxide, surface active agent and antifoaming agent.

Preferably, an amount of the copolymerized emulsion in the filming solution is about 4–40 wt % in a solid state.

In addition, to prevent the copolymerized emulsion from freezing and changing in viscosity, a stabilizing agent such as G-110 (trademark of Rohm & Haas Company) may be further added.

Furthermore, when the above described filming solution is deposited on the phosphor screen through an evaporation process, ammonium oxalate may be simultaneously sprayed on the deposited filming solution to prevent the aluminum layer from swelling.

Various examples and comparative examples will be described more in detail hereinafter.

EXAMPLE 1

After 480 g of butyl methacrylate, 8 g of hydroxyethyl methacrylate, 8 g of acrylic acid, 650 g of pure water, and 4 g of sodium dodecyl sulfosuccinate (Trademark: Triton GR-5M) were mixed, 15 g of 1 wt % potassium persulfonate was added as a polymerizing starting material. This mixture was heated at a temperature of 75° C., thereby obtaining butyl methacrylate emulsion at a yield of 98%.

After heat analyzing the emulsion obtained, it was noted that 5 wt % and 95 wt % loss points were respectively 220° C. and 340° C. In addition, it was further noted that residual carbon at a temperature of 450° C. was 1.0 wt %.

EXAMPLE 2

After 480 g of butyl methacrylate, 8 g of hydroxyethyl methacrylate, 4 g of acrylic acid, 650 g of pure water, and 4 g of sodium dodecyl sulfosuccinate were mixed, 15 g of 1 wt % potassium persulfonate was added as a polymerizing starting material. This mixture was heated at a temperature of 75° C., thereby obtaining butyl methacrylate emulsion at a yield of 98%.

After heat analyzing the emulsion obtained, it was noted that 5% and 95 wt % loss points were respectively 220° C. and 340° C. In addition, it was further noted that residual carbon at a temperature of 450° C. was 0.4 wt %.

Comparative Example 1

After 55 g of methyl methacrylate, 40 g of ethyl methacrylate, 5 g of methacrylic acid, 300 g of pure water, and 4 g of sodium dodecyl sulfosuccinate were mixed, 3 g of 1 wt % potassium persulfonate was added as a polymerizing starting material. This mixture was heated at a temperature of 75° C. thereby obtaining 25 wt % of conventional emulsion at a yield of 95%.

After heat analyzing the emulsion obtained, it was noted that 5 wt % and 95 wt % loss points were respectively 205° C. and 430° C. In addition, it was further noted that residual carbon at a temperature of 450° C. was 3 wt %.

EXAMPLE 3

Butyl methacrylate, hydroxyethyl methacrylate, methyl methacrylate, and acrylic acid were copolymerized at a ratio of 120:1:1:1, thereby obtaining copolymerized emulsion. The 4 wt % of copolymerized emulsion was mixed with 0.4 wt % of polyvinyl alcohol, 0.2 % of hydrogen peroxide, and pure water, then agitated. This mixture was adjusted by aqueous ammonia such that pH thereof becomes 7.0, thereby obtaining 1000 g of filming solution of the present invention.

The filming solution was deposited on a phosphor screen through a spin-coating process. After the filming solution was dried to form a filming layer on the phosphor screen, an aluminum layer was deposited on the filming layer through an evaporation process. The filming layer was undergone a baking process simultaneously with a flit sealing process which is conducted at a temperature of 450° C. to combine a panel and a funnel with each other.

After measuring brightness, it was noted that the brightness is about 80% of a conventional filming solution which will be described in Comparative Example 2.

EXAMPLE 4

Butyl methacrylate, hydroxyethyl methacrylate, and acrylic acid were copolymerized at a ratio of 120:1:1, thereby obtaining copolymerized emulsion. The 9 wt % of copolymerized emulsion was mixed with 0.4 wt % of polyvinyl alcohol, 0.2 wt % of hydrogen peroxide, and pure water, then agitated. This mixture was adjusted by aqueous ammonia such that pH thereof becomes 7.0, thereby obtaining 1000 g of filming solution.

The filming solution was deposited on a phosphor screen through a spin-coating process. After the filming solution was dried, ammonium oxalate solution was sprayed to form a filming layer on the phosphor screen. Then, an aluminum layer was deposited on the filming layer through an evaporation process. The filming layer was undergone a baking process simultaneously with a flit sealing process which is conducted at a temperature of 450° C. to combine a panel and a funnel with each other.

After measuring brightness, it was noted that the brightness is about 102% of a conventional filming solution which will be described in Comparative Example 2.

EXAMPLE 5

Butyl methacrylate, hydroxyethyl methacrylate and acrylic acid were copolymerized at a ratio of 120:1:1, thereby obtaining copolymerized emulsion. The 10 wt % of copolymerized emulsion was mixed with 0.4 wt % of polyvinyl alcohol, 0.2 wt % of hydrogen peroxide, 0.07 wt % of sodium salt polymeric carboxylic acid (Trademark: Ortan 731-SD of Rohm & Haas Company), and pure water, then agitated. This mixture was adjusted by aqueous ammonia such that pH thereof becomes 7.0, thereby obtaining 1000 g of filming solution.

The filming solution was deposited on a phosphor screen through a spin-coating process. After the filming solution was dried, ammonium oxalate solution was sprayed to form a filming layer on the phosphor screen. Then, an aluminum layer was deposited on the filming layer through an evaporation process. The filming layer was undergone a baking process simultaneously with a flit sealing process which is conducted at a temperature of 450° C. to combine a panel and a funnel with each other.

After measuring brightness, it was noted that the brightness is about 105% of a conventional filming solution which will be described in Comparative Example 2.

EXAMPLE 6

Butyl methacrylate, isobonyl methacrylate, and acrylic acid were copolymerized at a ratio of 120:1:1, thereby obtaining copolymerized emulsion. The 15 wt % of copolymerized emulsion was mixed with 0.4 wt % of polyvinyl alcohol, 0.2 wt % of hydrogen peroxide, and pure water, then agitated. This mixture was adjusted by aqueous ammonia such that pH thereof becomes 7.0, thereby obtaining 1000 g of filming solution.

The filming solution was deposited on a phosphor screen through a spin-coating process. After the filming solution was dried, ammonium oxalate solution was sprayed to form a filming layer on the phosphor screen. Then, an aluminum layer was deposited on the filming layer through an evaporation process. The filming layer was undergone a baking process simultaneously with a flit sealing process which is conducted at a temperature of 450° C. to combine a panel and a funnel with each other.

After measuring brightness, it was noted that the brightness is about 107% of a conventional filming solution which will be described in Comparative Example 2.

Comparative Example 2

15 wt % of B 74 (Trademark of Rohm & Haas company), 0.4 wt % of polyvinyl alcohol, 0.3 wt % of hydrogen peroxide, and 0.3 wt % of glycerin were mixed with pure water. This mixture was adjusted by aqueous ammonia such that pH thereof becomes 7.0, thereby obtaining 1000 g of conventional filming solution.

The filming solution was deposited on a phosphor screen. After the filming solution was dried to form a filming layer on the phosphor screen, an aluminum layer was deposited on the filming layer. The filming layer was undergone a baking process at a temperature of 450° C., then further undergone another baking process which is conducted at a temperature of 450° C. to combine a panel and a funnel with each other.

EXAMPLE 7

15 wt % of butyl methacrylate, 84 wt % of pure water, 0.5 wt % of sodium dodecyl sulfate as a surface active agent, and 0.5 wt % of potassium sulfate ($K_2S_2O_8$) as a polymerizing starting material were mixed, then agitated at a rotational speed of about 4000 rpm for 10 minutes. After this, this mixture was further agitated slowly at a temperature of about 60° C. for 4 hours, thereby obtaining 1000 g of copolymerized emulsion. Then, 0.5 wt % of polyvinyl alcohol, 0.3 wt % of hydrogen peroxide, 1.5 wt % of glycerin., and 0.03 wt % of ammonium oxalate were added to the copolymerized emulsion obtained, then adjusted by aqueous ammonia such that pH thereof becomes 7.0, thereby obtaining 1023 g of filming solution.

The filming solution was deposited to form a filming layer on a phosphor screen, after which an aluminum layer was deposited on the filming layer. The filming layer was undergone a baking process simultaneously with a flit sealing process which is conducted at a temperature of 450° C. to combine a panel and a funnel with each other. When measuring PL (photo luminance), it was 202%.

EXAMPLE 8

12 wt % of butyl methacrylate, 3 wt % of methacrylic acid, 84 wt % of pure water, 0.5 wt % of sodium dodecyl sulfate (SDS) as a surface active agent, and 0.5 wt % of potassium persulfate ($K_2S_2O_8$) as a polymerizing starting material were mixed, then agitated at a rotational speed of about 4000 rpm for 10 minutes. After this, this mixture was further agitated slowly at a temperature of about 60° C. for 4 hours, thereby obtaining 1000 g of copolymerized emulsion. Then, 0.5 wt % of polyvinyl alcohol, 0.3 wt % of hydrogen peroxide, 1.5 wt % of glycerin, and 0.03 wt % of ammonium oxalate were added to the copolymerized emulsion obtained, then adjusted by aqueous ammonia such that pH thereof becomes 7.0, thereby obtaining 1023 g of filming solution.

The filming solution was deposited to form a filming layer on a phosphor screen, after which an aluminum layer was deposited on the filming layer. The filming layer was undergone a baking process simultaneously with a flit sealing process which is conducted at a temperature of 450° C. to combine a panel and a funnel with each other. When measuring PL(photo luminance), it was 210%.

Comparative Example 3

15 wt % of B 74, 0.5 wt % of polyvinyl alcohol, 0.3 wt % of hydrogen peroxide, 1.5 wt % of glycerin, and 0.03 wt % of ammonium oxalate were mixed with pure water. This mixture was a adjusted by aqueous ammonia such that pH thereof becomes 7.0, thereby obtaining conventional filming solution.

The filming solution was deposited to form a filming layer on a phosphor screen, after which an aluminum layer was deposited on the filming layer. The filming layer was undergone a baking process at a temperature of 450° C. When measuring PL(photo luminance), it was 190%.

While the invention has been described in connection with what is presently considered to be the most practical an preferred embodiments, it is to be understood that the invention is not limited to the disclosed embodiments, but, on the contrary, it is intended to cover various modifications and equivalent methods included within the spirit and scope of the appended claims.

What is claimed is:

1. A filming solution, comprising:
   a copolymerized emulsion having more than 70 weight percent of butyl methacrylate, having more than one species of monomer, and having sodium dodecyl sulfosuccinate; and
   more than one species of additive;
   said more than one species of monomer being selected from the group consisting of acrylic acid derivative, methacrylic acid derivative, styrene, acrylamide, and acrylonitrile;
   said methacrylic acid derivative being selected from the group consisting of methacrylic acid, methyl methacrylate, ethyl methacrylate, hydroxyethyl methacrylate, isobonyl methacrylate, benzyl methacrylate, and phenoxy methacrylate.

2. The filming solution of claim 1, said acrylic acid derivative being selected from the group consisting of acrylic acid, methyl acrylate, ethyl acrylate, and benzyl acrylate.

3. The filming solution of claim 1, wherein an amount of said emulsion in the filming solution is about 4 to 40 weight percent in a solid state.

4. The filming solution of claim 1, said more than one species of additive being selected from the group consisting of polyvinyl alcohol, hydrogen peroxide surface active agent and antifoaming agent.

5. The filming solution of claim 1, said more than one species of monomer including methacrylic acid.

6. The filming solution of claim 1, further comprising a viscosity enhancing material.

7. A filming solution emulsion, comprising:
   a copolymerized emulsion comprising more than 85 weight percent of butyl methacrylate;

at least one monomer selected from the group consisting of acrylic acid derivative, methacrylic acid derivative, styrene, acrylamide, and acrylonitride; and sodium dodecyl sulfosuccinate;

said acrylic acid derivative being selected from the group consisting of acrylic acid, methyl acrylate, ethyl acrylate, and benzyl acrylate;

said methacrylic acid derivative being selected from the group consisting of methacrylic acid, methyl methacrylate, ethyl methacrylate, hydroxyethyl methacrylate, isobonyl methacrylate, benzyl methacrylate, and phenoxy methacrylate.

8. The copolymerized emulsion of claim 7, when said at least one monomer comprises said acrylic acid derivative and said methacrylic acid derivative, said acrylic acid derivative being 0.1 to 10 weight percent of acrylic acid, and said methacrylic acid derivative being 0.1 to 20 weight percent of hydroxyethyl methacrylate.

9. A filming solution comprising:

a copolymerized emulsion structured to form a filming layer, the emulsion comprising more than 85 weight percent of butyl methacrylate;

at least one species of monomer; and at least sodium dodecyl sulfosuccinate;

wherein a residual carbon of the filming solution is in a range between about 0.4 weight percent to about 1.0 weight percent, when the filming solution is heated to about 450° C.

10. The filming solution of claim 1, wherein a residual carbon of the filming solution is in a range between about 0.4 weight percent to about 1.0 weight percent, when the filming solution is heated to about 450° C.

11. The filming solution emulsion of claim 7, wherein a residual carbon of the filming solution is in a range between about 0.4 weight percent to about 1.0 weight percent, when the filming solution is heated to about 450° C.

12. The filming solution of claim 1, said filming solution being at a temperature of approximately 220° C. and having an approximately 5 percent weight loss point at the temperature of approximately 220° C.

13. The filming solution emulsion of claim 7, said filming solution emulsion being at a temperature of approximately 220° C. and having an approximately 5 percent weight loss point at the temperature of approximately 220° C.

14. The filming solution emulsion of claim 9, said filming solution being at a temperature of approximately 220° C. and having an approximately 5 percent weight loss point at the temperature of approximately 220° C.

* * * * *